United States Patent [19]

Markowitz

[11] 4,148,544

[45] Apr. 10, 1979

[54] ADJUSTABLY POSITIONABLE ELECTRICAL OUTLET

[76] Inventor: Isral J. Markowitz, 7105 NW. 84th St., Lamarac, Fla. 33319

[21] Appl. No.: 838,002

[22] Filed: Sep. 29, 1977

[51] Int. Cl.² ............... H01R 25/00; H01R 31/00
[52] U.S. Cl. ........................... 339/154 R; 339/9 R; 339/170
[58] Field of Search .............. 339/2, 6, 9, 20, 21, 339/23, 153, 154, 155, 166, 170

[56] References Cited

U.S. PATENT DOCUMENTS

| 2,362,481 | 11/1944 | Hartmann | 339/2 R |
|---|---|---|---|
| 2,366,634 | 1/1945 | Ludwig | 339/9 A |
| 2,520,243 | 8/1950 | Hoffman | 339/170 |
| 4,046,448 | 9/1977 | Miller | 339/153 |

*Primary Examiner*—Neil Abrams
*Attorney, Agent, or Firm*—Lackenbach, Lilling & Siegel

[57] ABSTRACT

An electrical outlet including telescopic members having plug and socket connectors on their remote ends and adjustable to select a desired distance between the plug and socket.

4 Claims, 5 Drawing Figures

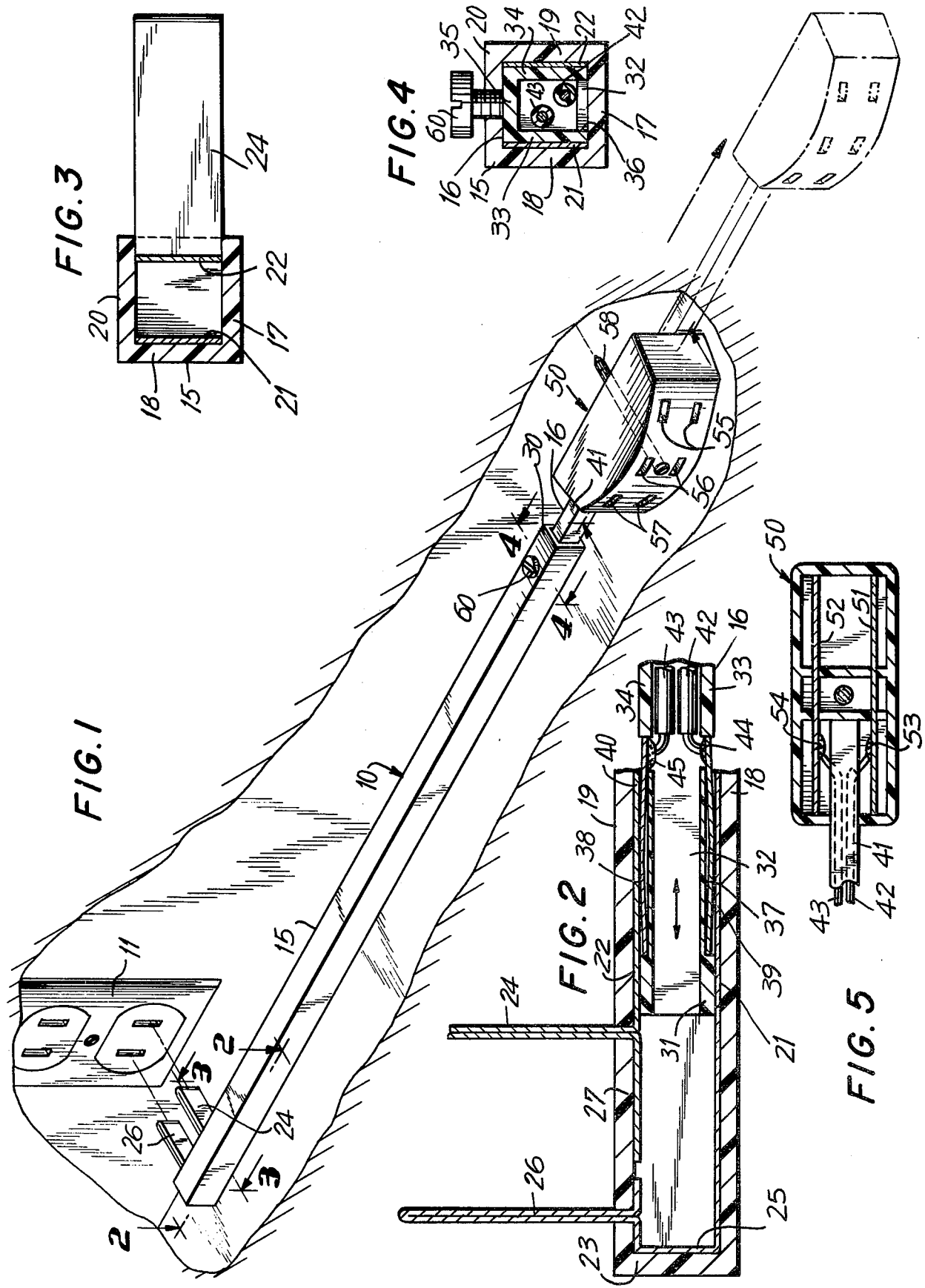

ADJUSTABLY POSITIONABLE ELECTRICAL OUTLET

BACKGROUND OF THE INVENTION

As is well known to those versed in the art of electrical outlets, the convenience of selectively positionable outlets has heretofore been seriously limited to certain complex and expensive devices, or to the ubiquitous extension cord with its problems of safety, unattractive appearance, and the like. Certain examples of the prior art having these difficulties are U.S. Pat. Nos. 3,534,319 to Queirolo et al; 2,952,829 to Grohsgal; 2,702,893 to Paulson; 2,611,800 to Naughton; 2,617,819 to Wright et al; 2,277,216 to Epstein; 2,161,841 to Adelman and 2,162,545 to Benander et al.

SUMMARY OF THE INVENTION

Accordingly, it is an important object of the present invention to provide an electrical outlet device which overcomes the problems of the prior art, is extremely simple in construction for reliability throughout a long useful life, is entirely safe in operation both electrically in having no exposed conductive parts and mechanically in being fastened along a wall to present no impedance to movement. The device of the instant invention is further capable of attractive and aesthetic appearance and occupies relatively little space so as not to detract from a desired decor.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a perspective view showing an electrical outlet device of the present invention in operative association with a building wall and receptacle, and illustrating in phantom an alternative position of the instant device.

FIG. 2 is a partial longitudinal sectional view taken generally along the line 2—2 of FIG. 1 to illustrate interior construction.

FIG. 3 is a transverse sectional view taken generally along the line 3—3 of FIG. 1.

FIG. 4 is a transverse sectional view taken generally along the line 4—4 of FIG. 1.

FIG. 5 is a partial longitudinal sectional view taken generally along the line 5—5 of FIG. 1.

DESCRIPTION OF THE PREFERRED EMBODIMENT

The electrical outlet of the present invention is best seen in FIG. 1, and there generally designated 10, being illustrated in solid lines as positioned for insertion in an electrical receptacle 11 mounted in a building wall 12.

The outlet device 10 includes a pair of elongate telescopic members 15 and 16 relatively movable in telescopic relation for extensile and contractile motion. One of the elongate members 15 may be an outer member of generally tubular configuration, and may be of generally rectangular or polygonal cross section as shown, or otherwise if desired. In the illustrated embodiment, the tubular outer elongate member 15 may include a bottom wall 17, side walls 18 and 19 upstanding from opposite edges of the bottom wall 17, and a top wall 20 extending across between the upper edges of side walls 18 and 19.

Internally of the outer elongate member or tubular element 15, as along the inner surfaces of side walls 18 and 19, may be a pair of elongate conductors, say conductive strips 21 and 22. One of the conductors or strips 21 may extend toward the distal end 23 of tube 15, remote from the inner elongate member or tube 16, and at a location adjacent to and spaced from the outer tube end 23 may be folded to define a prong 24 extending laterally outwardly through and projecting from the tube side wall 18. The other elongate conductive strip or conductor 22 may extend to the outer tube end 23, thereacross, as at 25, onto the inner surface of tube wall 21 and thence be folded or bent to define a prong 26 extending laterally through and projecting beyond the outer tube side wall 18 at a location spaced between the prong 24 and the outer tube end 23. As will appear more fully hereinafter, the conductive prongs 24 and 26 combine with the adjacent end portion 27 of elongate member 15 to define an electric plug for insertion into and connection with the wall receptacle 11.

The inner elongate member 16 may also be tubular, and may be of similar cross sectional configuration to the outer elongate member 15, for conforming engagement in the latter. That is, the end region 30 of outer elongate member 15 opposite to end region 23 may be considered an inner or engaging end in receiving or engaging relation with the inner or engaging end region 31 of the inner elongate member 16.

More specifically, the inner elongate member 16 may include a bottom wall 32 along the inner surface of outer member bottom wall 17, a pair of side walls 33 and 34 upstanding from opposite edges of the bottom wall 32, and a top wall 35 extending across and between the upper edges of the side walls 33 and 34. The bottom wall 32 of inner elongate member 16 may have an elongate through opening 36, if desired.

The side walls 33 and 34 of inner elongate member 16 may be provided, adjacent to inner or engaging end 31, with respective outwardly facing recesses 29 and 40. The recesses 39 and 40 face toward respective side walls 18 and 19 of the outer elongate member, and open directly toward respective conductors or strips 21 and 22. Internally of the recesses 39 and 40 may be mounted elongate resilient conductive members 37 and 38, preferably in the nature of leaf springs and bowed outwardly, as seen in FIG. 2 for contacting engagement with the respective adjacent conductors 21 and 22. Thus, upon relative telescopic movement of elongate members 15 and 16, the conductive leaves 37 and 38 effectively wipe and maintain a constant engagement with their associated conductors 21 and 22, to define wipers.

Internally of the inner elongate member 16, extending from the inner or engaging end 31 of the elongate member toward the outer, distal or non-engaging end region 41, may be a pair of electric wires or conductors 42 and 43. These conductors are respectively electrically connected, as by solder connections 44 and 45 to wipers or resilient leaves 37 and 38.

Carried on the other, outer or distal end region 41 of inner elongate member 16 is an electrical socket 50, which may be provided internally with conductors or conductive bars 51 and 52 respectively electrically connected to the adjacent ends of conductors or wires 42 and 43, as by solder connections 53 and 54. The socket 50 may be of any suitable design, say having a plurality of pairs of prong receiving holes 55, 56 and 57, and may be provided with suitable wall fastener means, such as a through extending threaded element 58.

Thus, with the plug defining projections 24 and 26 engaged in a wall receptacle 11, the fastener 58 may be secured to a wall to positively maintain the outlet 10 in a desired position. The desired position is maintained by selectively telescopic extensile and retractile movement of elongate members 15 and 16 to locate the socket 50 as desired. To maintain this desired location, there may be utilized a setscrew or holding member 60 threadedly engaged through the top wall 20 of outer elongate member 15 for holding engagement with the top wall 35 of inner elongate member 16.

From the foregoing, it is seen that the instant invention provides an electrical outlet device which is extremely simple in construction, durable and reliable throughout a long useful life, capable of selected location as desired, even permanently or temporarily, being uniquely attractive in appearance so as not to detract from desired decor, and which otherwise fully accomplishes its itended objects.

Although the present invention has been described in some detail by way of illustration and example for purposes of clarity of understanding, it is understood that certain changes and modifications may be made within the spirit of the invention.

What is claimed is:

1. An electrical outlet for use along a wall surface comprising a pair of telescopically extensile and retractile elongate members wherein one of which is receivable in the other of said elongate members, said elongate members having proximate engaging ends in overlapping engagement and distal non-engaging ends remote from each other, a first pair of longitudinally extending conductors carried by one of said elongate members, a pair of conductive wipers carried by the other of said elongate members adjacent to its engaging end in contact with said first pair of conductors for wiping engagement with the latter upon telescopic movement of said elongate members, additional conductors carried by said other elongate member electrically connected to said pair of wipers and extending toward said non-engaging end of said other elongate member, a plug for engagement in a receptacle, and a socket for receiving a connector, said plug and socket being carried by said non-engaging ends and electrically connected to adjacent conductors; said first pair of conductors being internally of said one elongate member, and said pair of wipers being exposed externally of said other elongate member for said wiping engagement; whereby when said plug of said electrical outlet is inserted into an existing electrical wall outlet, said wall outlet in effect becomes adjustably positionable within a predetermined distance from said wall outlet by the selective telescopic extensile and retractile movement of said elongate members parallel to said wall surface containing said wall outlet.

2. An electrical outlet according to claim 1, said additional conductors being internally of said other elongate member for protection thereby.

3. An electrical outlet for use along a wall surface comprising a pair of telescopically extensile and retractile elongate members, said elongate members having proximate engaging ends in overlapping engagement and distal non-engaging ends remote from each other, a first pair of longitudinally extending conductors carried by one of said elongate members, a pair of conductive wipers carried by the other of said elongate members adjacent to its engaging end in contact with said first pair of conductors for wiping engagement with the latter upon telescopic movement of said elongate members, additional conductors carried by said other elongate member electrically connected to said pair of wipers and extending toward said non-engaging end of said other elongate member, a plug for engagement in a receptacle, and a socket for receiving a connector, said plug and socket being carried by said non-engaging ends and electrically connected to adjacent conductors; said one and other elongate members being outer and inner tubes respectively, said first pair of conductors extending internally along said outer tube, and said plug comprising extensions of said first pair of conductors extending externally of said outer tube; whereby when said plug of said electrical outlet is inserted into an existing electrical wall outlet, said wall outlet in effect becomes adjustably positionable within a predetermined distance from said wall outlet by the selective telescopic extensile and retractile movement of said elongate members parallel to said wall surface containing said wall outlet.

4. An electrical outlet according to claim 3, said socket being fixed to the non-engaging end of said inner tube.

* * * * *

UNITED STATES PATENT OFFICE
CERTIFICATE OF CORRECTION

PATENT NO. : 4148544
DATED : April 10, 1979
INVENTOR(S) : Isral J. Markowitz

It is certified that error appears in the above–identified patent and that said Letters Patent are hereby corrected as shown below:

In No. 76 concerning the inventor's address, the town should read --Tamarac-- and not Lamarac.

Signed and Sealed this

Seventeenth Day of July 1979

[SEAL]

Attest:

Attesting Officer

LUTRELLE F. PARKER
Acting Commissioner of Patents and Trademarks